SELF-ADAPTIVE TIMING SYSTEM FOR TRAFFIC CONTROLLER

Filed Oct. 22, 1965 6 Sheets-Sheet 1

INVENTORS
VERNOR B. CRESS, JR.
PETER F. APITZ
PHILLIP G. HALAMANDARIS
ROSS W. WHEELER
EUGENE P. HOYT
BY Edward A. Sokolski
ATTORNEY INVENTORS
VERNOR B. CRESS, JR.
PETER F. APITZ
PHILLIP G. HALAMANDARIS
ROSS W. WHEELER
EUGENE P. HOYT
BY
ATTORNEY Dec. 3, 1968 V. B. CRESS, JR., ET AL 3,414,876

SELF-ADAPTIVE TIMING SYSTEM FOR TRAFFIC CONTROLLER

Filed Oct. 22, 1965

6 Sheets-Sheet 3

INVENTORS
VERNOR B. CRESS, JR.
PETER F. APITZ
PHILLIP G. HALAMANDARIS
ROSS W. WHEELER
EUGENE P. HOYT

BY Edward A. Showalter
ATTORNEY

SELF-ADAPTIVE TIMING SYSTEM FOR TRAFFIC CONTROLLER

INVENTORS
VERNOR B. CRESS, JR.
PETER F. APITZ
PHILLIP G. HALAMANDARIS
ROSS W. WHEELER
EUGENE P. HOYT
BY Edward J. Sokolski
ATTORNEY INVENTORS
VERNOR B. CRESS, JR.
PETER F. APITZ
PHILLIP G. HALAMANDARIS
ROSS W. WHEELER
EUGENE P. HOYT
BY Edward A. Sokolski
ATTORNEY INVENTORS
VERNOR B. CRESS, JR.
PETER F. APITZ
PHILLIP G. HALAMANDARIS
ROSS W. WHEELER
EUGENE P. HOYT
BY Edward A. Sokolski
ATTORNEY United States Patent Office 3,414,876
Patented Dec. 3, 1968

3,414,876
SELF-ADAPTIVE TIMING SYSTEM FOR TRAFFIC CONTROLLER

Vernor B. Cress, Jr., Rowland Heights, Peter F. Apitz, Placentia, Phillip G. Halamandaris, Fullerton, and Ross W. Wheeler and Eugene P. Hoyt, Santa Ana, Calif., assignors to Tamar Electronics Industries, Inc., Anaheim, Calif., a corporation of Delaware
Filed Oct. 22, 1965, Ser. No. 501,474
11 Claims. (Cl. 340—36)

ABSTRACT OF THE DISCLOSURE

A traffic controller operates first and second sets of traffic signals for controlling traffic on first and second intersecting streets respectively. A gap counter which includes a vehicle detector operating in conjunction with a clock pulse generator and a shift register is utilized to generate a timing signal in accordance with the gaps between traffic on one of the streets. Separate computers, each of which includes a vehicle detector operating in conjunction with a digital counter, are utilized to compute the volume of traffic waiting at the traffic signal, the density of traffic on the moving street, and the time that vehicles have been waiting at the traffic signal respectively. A logical gating control circuit is utilized to compare the outputs of each of the computers with the gap counter output to generate a timing signal in accordance with the relationship therebetween. This timing signal is used to control the green extension timing of the traffic controller.

Figure 1:
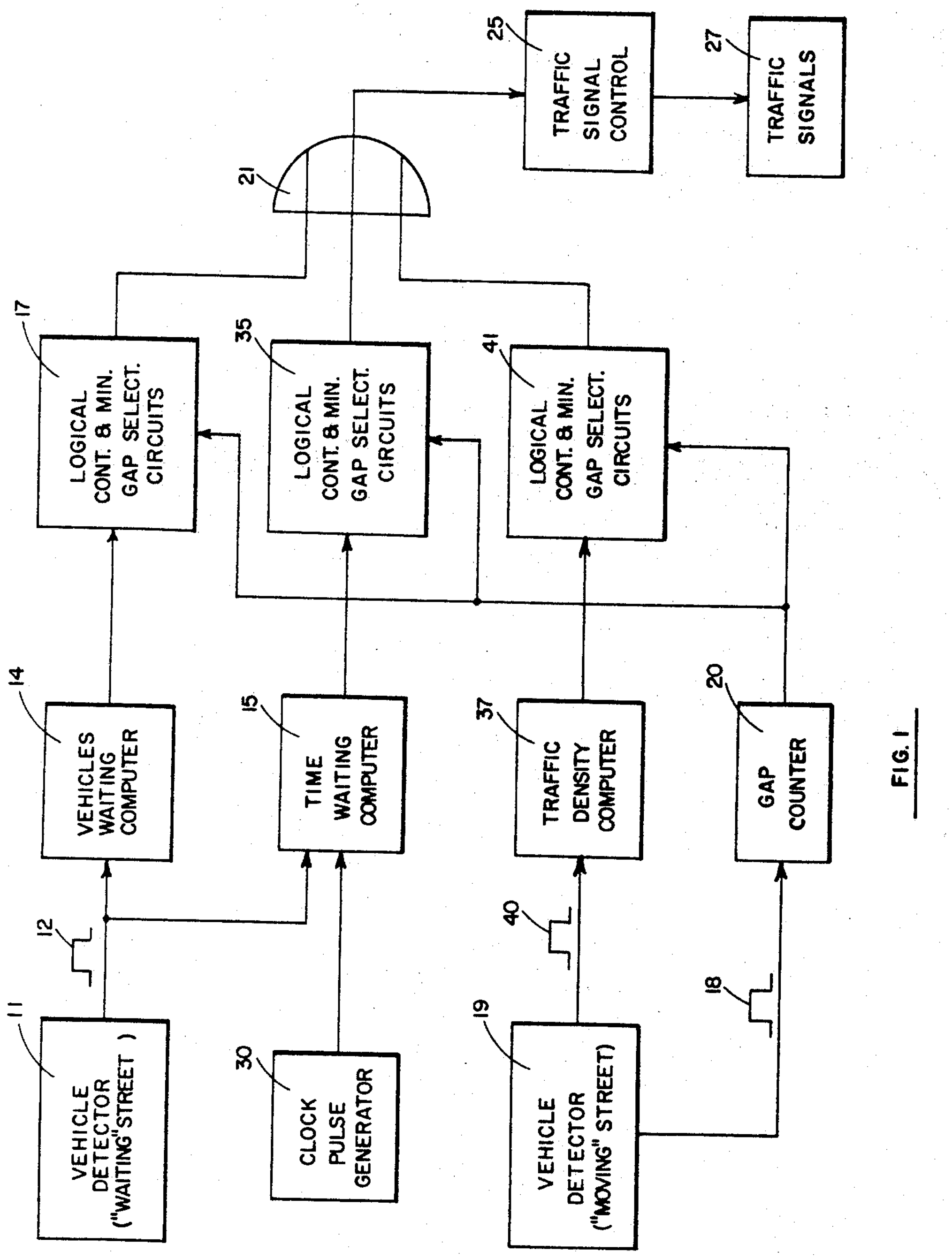

This invention relates to a self-adaptive timing system for a traffic controller, and more particularly to such a system in which the gap between vehicles moving along a street is controlled in accordance with measured traffic conditions by varying the duration of the green signal extension timing intervals.

In a typical traffic control system having an actuated phase of operation, such as described, for example, in pending patent application Ser. No. 467,397, filed on June 28, 1965, and assigned to Tamar Electronics Industries, Inc., a "maximum extension green" timing interval is provided by means of which the green signal is maintained "on" in response to the actuation of a vehicle detector by vehicles arriving on the scene during the "green" timing cycle. In these systems, each actuation of the vehicle detector extends the green timing interval for a fixed time period, the green timing cycle finally being terminated after a pre-determined "maximum extended green" timing interval has elapsed or the fixed extension time elapses before the detector is actuated by another vehicle.

The selection of the pre-determined timing interval provided for each vehicle actuation is at best a compromise, and thus often fails to provide optimum operation for existing traffic conditions. Thus, if the extension timing intervals provided are overly long, with a large amount of traffic waiting at the red traffic signal on the opposing street and with a comparatively small amount of traffic on the "moving" street, traffic will be unnecessarily tied up. On the other hand, if the green extension timing interval is too short, it may be inadequate to properly allow the moving traffic to pass. Further, with a fixed green extension timing interval, the light may often be switched over at an inopportune time, e.g., while a platoon of traffic is passing through. In traffic control, it is highly desirable to maintain a predetermined gap between traffic to assure optimum traffic flow. The use of a fixed extension green timing interval in response to each vehicle actuation cannot adapt to changing traffic conditions and thus fails to optimize traffic control as traffic conditions vary.

The timing system of this invention provides means for varying the green extension timing in accordance with the immediate measured traffic conditions. This end result is achieved in the following manner: Means are provided for computing such conditions as the number of vehicles waiting at the red light, the time the first of such vehicles to arrive has been waiting, and the traffic density on the street on which traffic is moving. Means are further provided to measure the gap between vehicles on the moving street. The computed outputs are fed to logical control circuitry wherein the measured gap information is utilized in conjunction therewith to generate a control signal which varies the extension green timing interval in accordance with the measured traffic conditions. The outputs of the logical control circuitry are combined so that the output providing the minimum extension green timing interval will govern.

The system of this invention utilizes a digital implementation which is readily adaptable to solid state circuitry. This makes for relatively compact construction and for highly accurate timing control. Further, it is adaptable for utilization with a traffic controller such as that described in the aforementioned patent application, with little or no modification of the existing circuitry.

It is therefore an object of this invention to provide an improved timing system for controlling the extension green timing interval of a traffic controller.

It is a further object of this invention to enable traffic gap control in accordance with existing traffic conditions.

It is still another object of this invention to provide a timing system for controlling the extension green timing interval of a traffic controller in accordance with immediate traffic conditions which can readily be incorporatel into an existing traffic controller.

It is still another object of this invention to optimize the extension green timing interval of a traffic controller.

Other objects of this invention will become apparent from the following description taken in connection with the accompanying drawings, of which—

Figure 2:
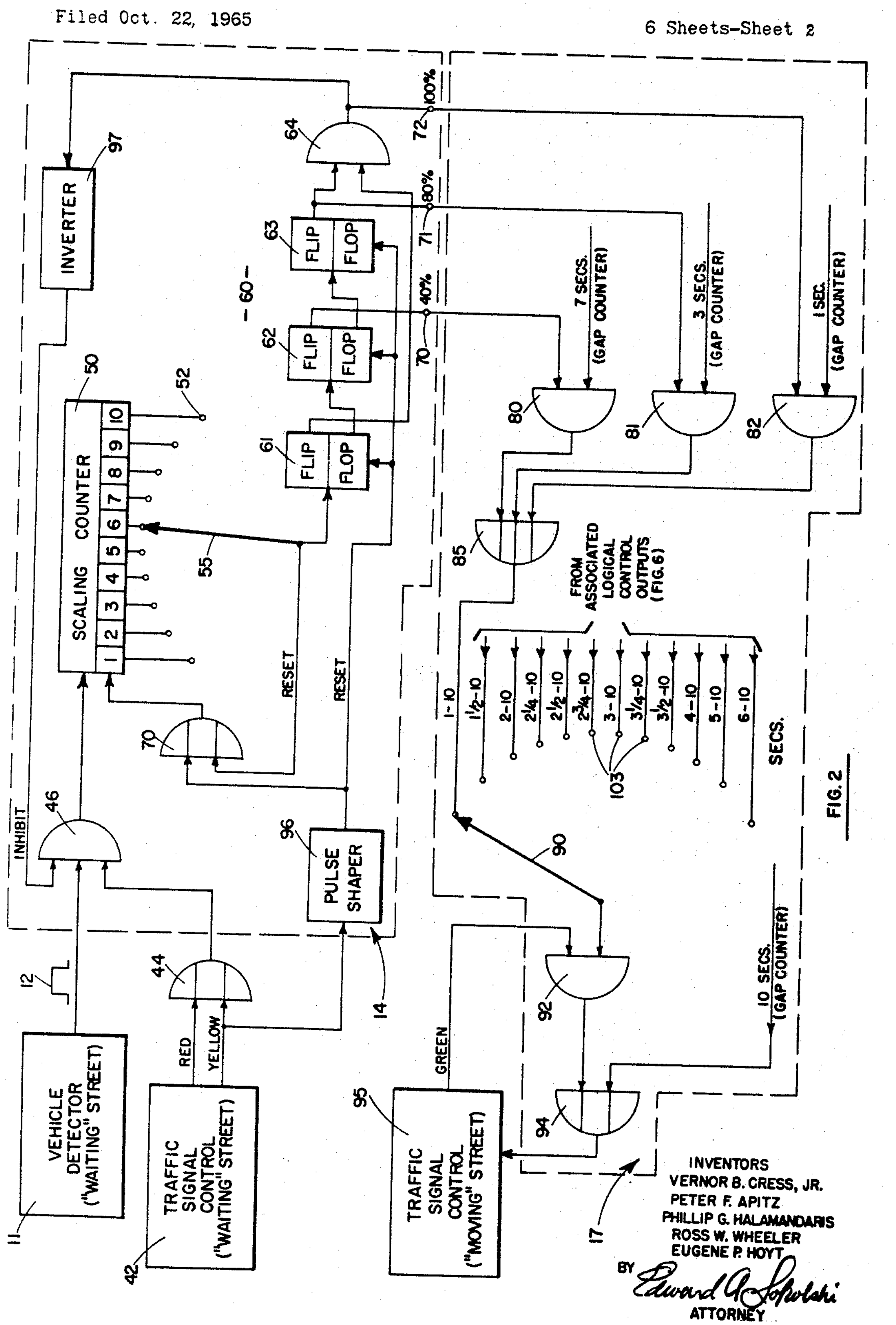
Figure 3:
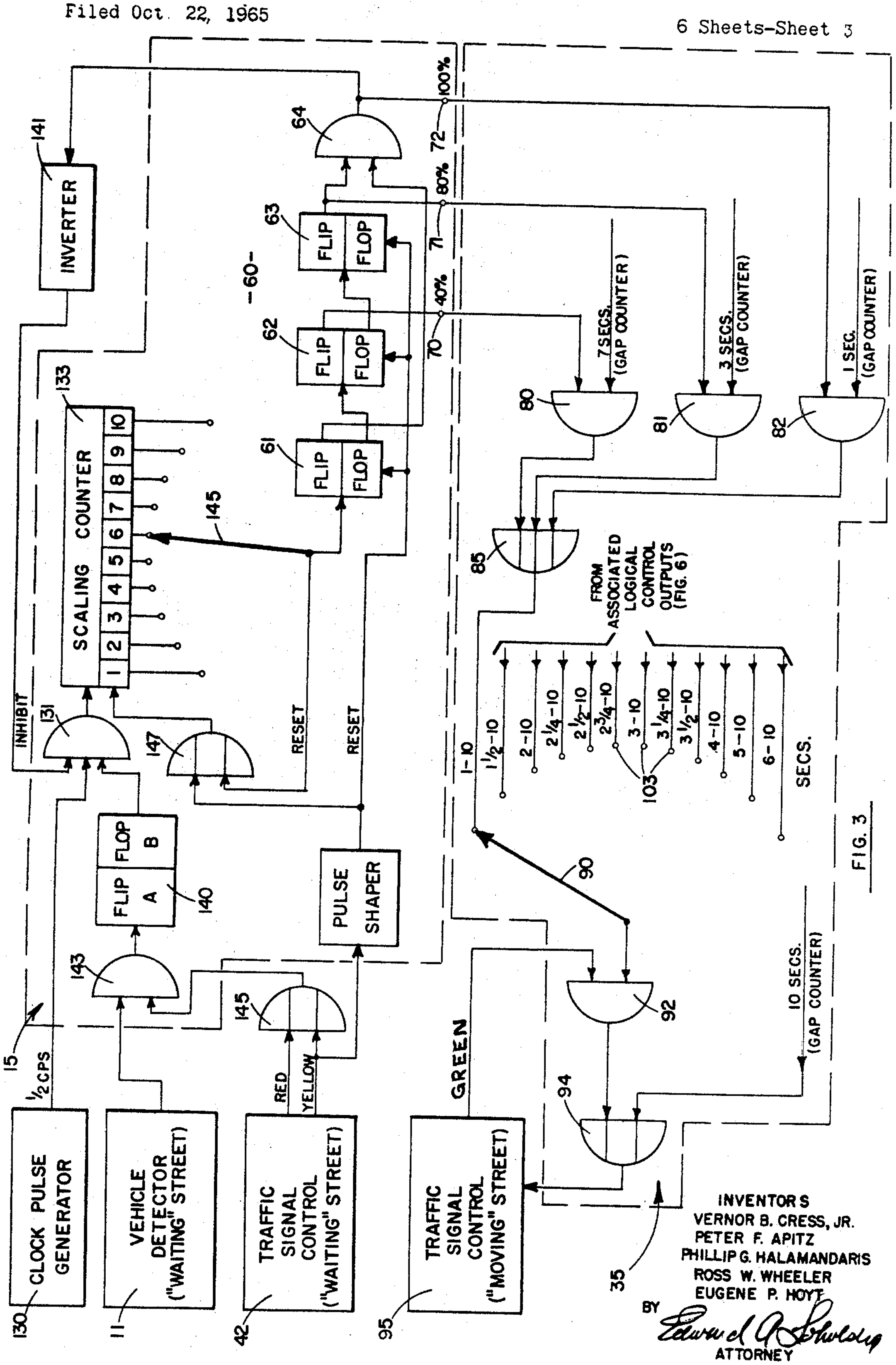
Figure 4:
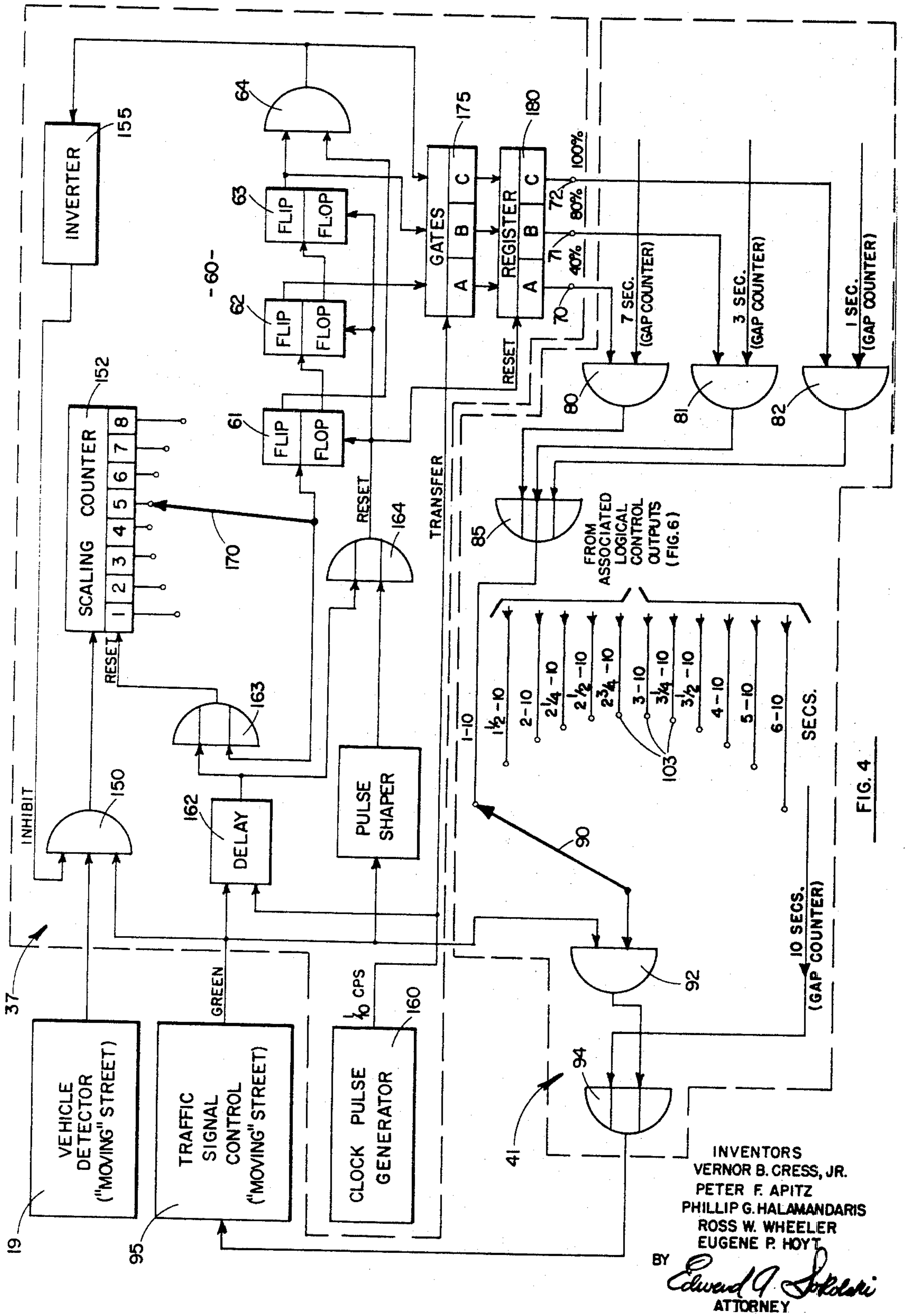
Figure 5:
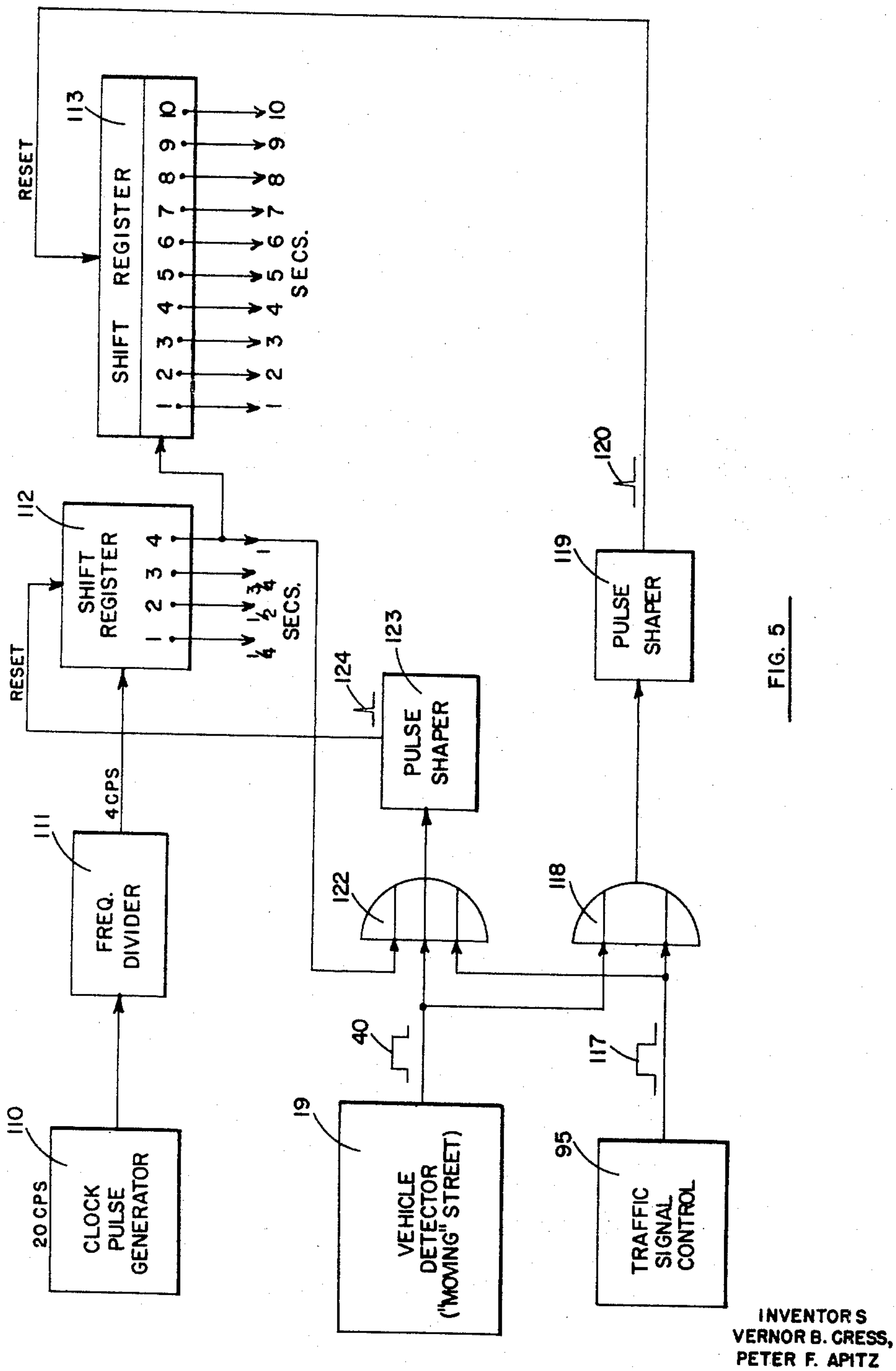
Figure 6:
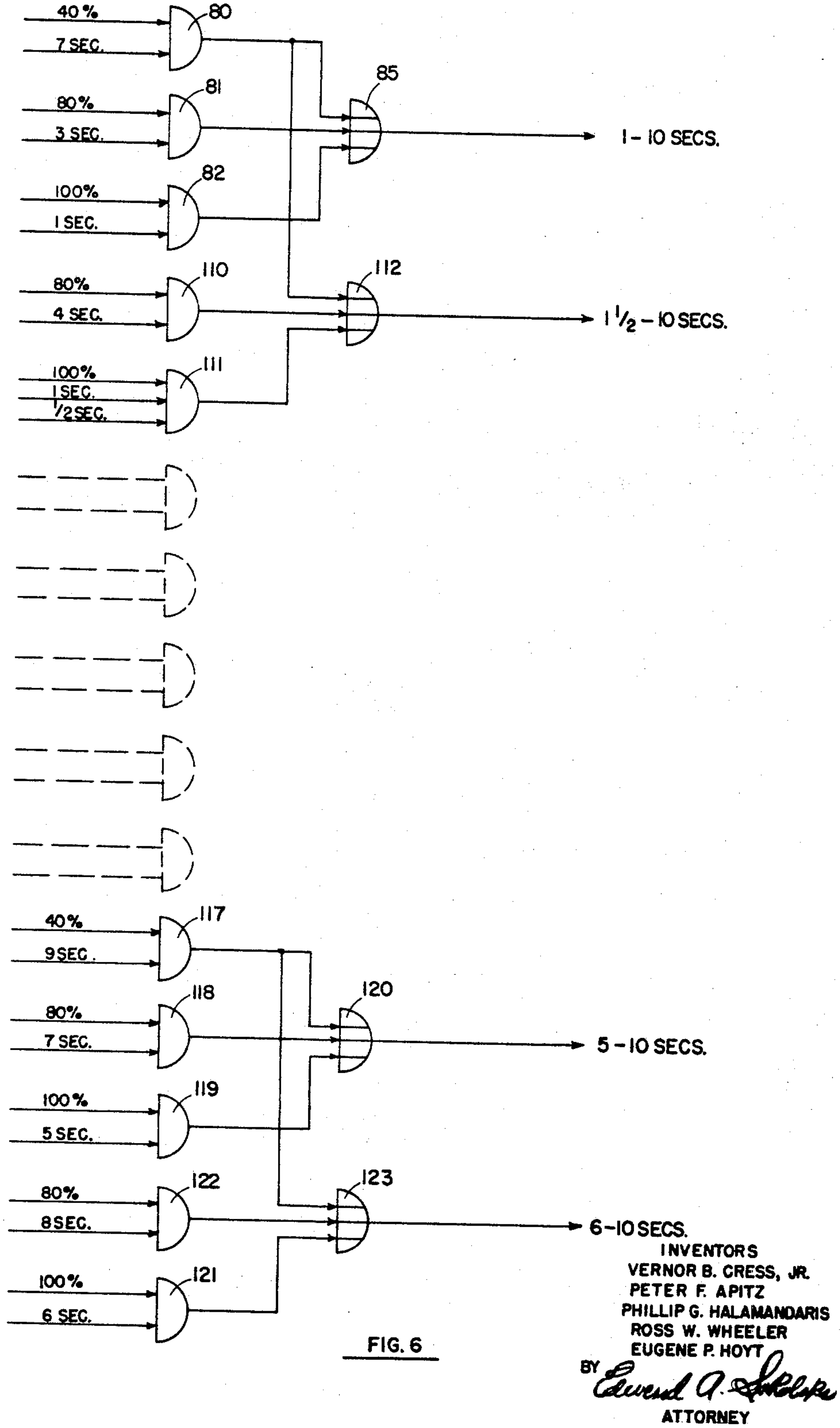

FIG. 1 is a block diagram illustrating the system of the invention,

FIG. 2 is a schematic drawing illustrating a preferred embodiment of the computing and logical control circuitry for the "vehicles waiting" function of the invention, FIG. 3 is a schematic diagram of a preferred embodiment of the computing and logical control circuitry for the "time waiting" function of the invention, FIG. 4 is a schematic diagram of a preferred embodiment of the computing and logical control circuitry for the "vehicle density" function of the invention, FIG. 5 is a schematic diagram of a preferred embodiment of a gap counter which may be utilized in the device of the invention, and FIG. 6 is a schematic diagram of logical control circuits which may be utilized in the device of the invention.

Referring now to FIG. 1, a block diagram illustrating the system of the invention is shown. Vehicle detector 11 is located on the street on which traffic is being held, hereinafter referred to as the "waiting" street, and provides an output pulse 12 for each vehicle arriving before the red or yellow signals. Pulses 12 are fed to vehicles waiting computer 14 and time waiting computer 15. Vehicles waiting computer 14 counts the pulses 12 and provides an output signal to logical control and minimum gap selector circuits 17, which is in accordance with the number of vehicles waiting before the signal.

Gap counter 20 receives a pulse 18 for each vehicle detected by vehicle detector 19 which detects the traffic on the street which the green signal is facing, hereinafter referred to as the "moving" street. Gap counter 20 by means of timing circuitry, to be explained in detail in connection with FIG. 5, provides an output signal indicative of the actual gap between the vehicles on the "moving" street. Logical control and minimum gap selector circuits 17 combine the output of gap counter 20, indicative of the actual gap between vehicles, with the output of computer 14, indicative of the number of vehicles waiting before the red signal, and provides an output signal to OR gate 21 when a predetermined relationship exists therebetween. The output of OR gate 21 is fed to traffic signal control 25 which controls traffic signal 27. Logical control and minimum gap selector circuits 17 terminate the extension green timing interval when certain combinations of gap conditions as measured by gap counter 20 and waiting vehicle conditions as computed by vehicles waiting computer 14 exist.

Time waiting computer 15 receives a timing signal from clock pulse generator 30. The timing operation of time waiting computer 15 is initiated when this computer receives a pulse 12 from vehicle detector 11, indicating the arrival of the first waiting vehicle. Thus, time waiting computer 15 produces a timing count indicative of how long such first arriving vehicle has been waiting. This signal is fed to logical control and minimum gap selector circuits 35, which operate similarly to logical control and minimum gap selector circuits 17, to provide a control output in response to various combinations of gap counter and time waiting computer outputs. The output of logical control and minimum gap selector circuits 35 is capable of independently providing a control signal to OR gate 21 for terminating the extension green timing interval.

Finally, traffic density computor 37 receives an output pulse 40 from vehicle detector 19 for each vehicle passing on the "moving" street, and by means of timing circuitry computes the density of the traffic flow or the number of cars passing per unit period of time. This information is fed from traffic density computer 37 to logical control and minimum gap selector circuits 41 where the information is correlated with the output of gap counter 20 to provide an output to OR gate 21 which controls the extension green timing interval in accordance with the measured density and gap conditions.

It is to be noted that any one of the logical control and minimum gap selector circuits 17, 35 or 41, can independently provide an output signal to terminate the "extension green" timing interval. Thus, the first of these to provide such a control signal during any such timing interval will govern. The minimum extension timing interval called for by any of the computed traffic conditions is thus provided, this as to be seen further on in the specifications establishing control in response to the most urgent demand.

Referring now to FIG. 2, a schematic drawing illustrating the computing and logical control functions for the vehicles waiting function is shown. Vehicle detector 11, which may comprise an electrical switching device on the road, provides an output pulse 12 for each vehicle arriving on the "waiting" street. Output signals indicative of the actuation of the red and yellow signals are fed from traffic signal control 42, which faces traffic on the "waitin" street, to OR gate 44 and thence to AND gate 46. Pulses 12 are thus passed from vehicle detector 11 through AND gate 46 whenever traffic signal control 42 is actuating its associated red or yellow signal lamps.

The output of AND gate 46 is fed to scaling counter 50, which may comprise a conventional ring counter. As indicated in FIG. 2, scaling counter 50 has output terminals 52 for each successive vehicle count made thereby. The output of scaling counter 50 is effectively scaled by means of selector switch 55. Thus, whenever the count in counter 50 corresponds to the setting of selector switch 55, an output pulse is fed to register 60 which includes flip-flops 61–63, and AND gate 64. Simultaneously, a reset signal is fed from switch 55 through OR gate 70 to reset scaling counter 50 to zero, so that a new count is initiated. Thus, register 60 receives a single pulse each time the number of cars counted by scaling counter 50 corresponds to the setting of switch 55. Three outputs are taken from register 60, one of these being taken from flip-flop 62 appearing at terminal 70, a second of these being taken from flip-flop 63 appearing at terminal 71, and a third one of these outputs being taken from AND gate 64 appearing at terminal 72.

Each of flip-flops 61–63 divides by two, and thus it takes four pulses from switch 55 to provide an actuation signal at terminal 70 and eight such pulses to provide an output signal at terminal 71. Utilizing logical gating, a signal is generated at terminal 72 for every ten pulses fed to the register from selector switch 55. Thus, for example, when AND gate 64 receives simultaneous outputs from both flip-flops 61 and 63, which situation will occur only after ten pulses have been received by register 60 from switch 55, AND gate 64 will have a TRUE output which appears at terminal 72.

Terminals 70, 71 and 72 are connected to the inputs of AND gates 80–82 respectively.

AND gates 80–82 also have signals fed thereto from the gap counter (see FIG. 5) which represent various preselected gap counts. In this instance, for example, the 1-second gap count output is fed to AND gate 82, the 3-second gap count output is fed to AND gate 81, and the 7-second gap count output is fed to AND gate 80. When any of the two inputs to one of AND gates 80–82 are present simultaneously, the associated gate will be actuated to provide a TRUE output which in turn actuates OR gate 85. Thus, for example, with an output signal at terminal 70 indicating that register 60 is 40% "full," an actuation signal is fed to OR gate 85 when the gap counter counts an interval of at least 7 seconds; with an "output" at terminal 71 a gap counter measurement of 3 seconds or greater will provide the actuation signal; while with register 60 completely filled, as indicated by an output at terminal 72, only a 1-second gap count is required to provide an actuation signal to OR gate 85. Scaling counter 50 and register 60 are both reset before the start of each timing operation by means of a reset signal fed thereto from traffic signal control 95 at the start of the "waiting street yellow" timing interval through pulse shaper 96. When register 60 is completely filled, an "inhibit" signal is fed from AND gate 64 through inverter 97 to AND gate 46 to prevent further input to the register.

With a TRUE signal from any one of AND gates 80–82, OR gate 85 has a TRUE output which is fed through switch 90 to AND gate 92. AND gate 92 also receives an input signal from traffic signal control 95 when the green signal on the "moving" street is being actuated to provide a TRUE output therefrom. The output of AND gate 92 is fed through OR gate 94 to terminate the extension green timing interval whenever the combined input conditions to one of AND gates 80–82 are satisfied, this of course occurring in a timing period determined by the associated gap counter output. In any event, a maximum green extension period of 10 seconds is provided by the ten-second timing output of the gap counter which is fed to OR gate 94.

For illustrative purposes, minimum gap selector switch has been shown in conjunction with a selected minimum timing gap of 1 second. Various other combinations of timing intervals operating in conjunction with "40%," "80%" and "100%" register outputs at terminals 70, 71 and 72 respectively may be selected by setting switch 90 to one of the other contact terminals 103. The operation of various such other logical gating arrangements to provide different minimum timing cycles is illustrated in FIG. 6 and explained in connection with this figure further on in the specification.

The various AND and OR gates described may comprise conventional diode or transistor circuits for performing these functions. In an operative embodiment of the device of the invention, the various gating functions are accomplished by means of signal inverting transistor amplifiers operating in a type of configuration which has come to be known as a "NOR" gate. This type of circuit has the advantage of economy of fabrication.

Referring now to FIG. 6, a schematic drawing is shown of logical gating circuitry which may be utilized to generate the various timing control outputs fed to switch contacts 103. These circuits all operate in similar fashion and therefore only several are presented for illustrative purposes. The logical gating circuitry for generating the 1–10 sec. signal and utilizing AND gates 80, 81, 82 and OR gate 85 has already been described in connection with FIG. 2. The 1½–10 sec. control signal is generated in similar fashion by means of AND gates 110, 111 and 80, and OR gate 112. AND gate 110 is driven to the TRUE state by the simultaneous appearance of inputs thereto from terminal 71 indicative of an 80% count, and the four-second output of the gap counter (FIG. 5). AND gate 111 has a TRUE output with the simultaneous appearance of a signal from terminal 72, indicative of a 100% count, along with the 1 and the ½ second outputs of the gap counter indicating a 1½ second count. OR gate 112 provides a timing control output when a control output from either AND gate 80, AND gate 110 or AND gate 111 is present, this occurring when one of the associated "AND" input conditions exist. So it can be seen that timing outputs of 5, 7 or 9 seconds can be obtained by means of gates 117–120 and timing outputs for 6, 8 or 9 seconds by means of gates 121–123 and 117.

The gating circuitry for generating other inputs for the terminals 103 (shown in FIG. 2) operate in similar fashion to generate the other desired timing inputs. Thus, depending on which operating conditions are selected by means of selector switch 90, different criteria are established for determining the green extension timing interval in response to existing traffic conditions. Each setting of the switch establishes a different minimum timing interval between 1 and 10 seconds along with a different set of timing intervals for the various register outputs appearing at terminals 70–72, with a maximum 10 second timing interval being established by the "10 sec." gap counter input to OR gate 94.

Referring now to FIG. 5, a schematic drawing of a preferred embodiment of the gap counter utilized in the device of the invention is shown. Clock pulse generator 110 generates precisely regulated clock pulses which are divided down to a frequency of 4 cycles per second by means of frequency divider 111. Clock pulse generator 110 may be any precisely regulated free-running oscillator, and frequency divider 111 may comprise flip-flops arranged in a binary divider configuration.

The output of frequency divider 111 drives shift register 112 to provide outputs therefrom at ¼ second intervals from terminals 1–4 thereof. The "1 sec." output appearing at terminal 4 is fed to drive shift register 113. Shift register 113 has outputs at its terminals 1–10 indicative of 1–10 second counts respectively. Shift registers 112 and 113 may comprise conventional flip-flop circuitry connected so as to shift actuation to a succeeding stage with the arrival of each input pulse thereto. Shift registers 112 and 113 in the absence of any re-setting thereof, as to be explained below, succeedingly produce output counts at each of their output terminals in response to the 4-cycle per second output of frequency divider 111, until the last stage of register 113 representing a 10-second count has been actuated. The shift register count will stop at this point unless a re-set signal is fed to the registers.

The gap counting is achieved by re-setting the shift registers in the following fashion: With the actuation of vehicle detector 19 by a vehicle on the "moving" street, a pulse 40 from the detector is fed through OR gates 122 and 118 to pulse shapers 123 and 119 respectively. In response to the leading edge of pulse 40, sharp differentiated pulses 124 and 120 are generated in the associated pulse shapers 123 and 119. Pulses 124 and 120 are used to re-set shift registers 112 and 113 respectively. Thus, the start of a counting period is initiated with the arrival of a vehicle to actuate vehicle detector 19. Shift registers 112 and 113 will generate output counts at their various terminals up until a second vehicle actuates vehicle detector 19, at which time the shift registers will be re-set. It thus can be seen that the maximum count output of the shift registers is indicative of the gap between the vehicles on the moving street. Thus, for example, if the maximum count output on the shift registers reaches 4½ seconds, the elapsed time between vehicles arriving at the vehicle detector is 4½ seconds. If the elapsed time between arriving vehicles is 10 seconds or more, shift register 113 will count all the way up to 10 secs., this being the maximum count. It thus can be seen that the highest gap counter outputs from shift registers 112 and 113 indicate the actual gap between vehicles. This information is used as explained in connection with FIG. 2 as a criterion in establishing the extension timing interval.

Referring now to FIG. 3, a schematic drawing of a preferred embodiment of circuitry for accomplishing the "time waiting" control function of the device of the invention is illustrated. The logical control and minimum gap selector circuits 35 utilized in accomplishing the "time waiting" control functions are identical to the logical control and minimum gap selector circuit 17 described in connection with FIG. 2, and therefore need not again be explained in detail. The same numerals have been utilized to identify corresponding components in FIGS. 3 and 2.

Clock pulse generator 130 has a precision pulse output which in the preferred embodiment of the device of the invention is at a frequency of ½ cycle per second. This pulse output is fed to AND gate 131. Pulses are fed through AND gate 131 to scaling counter 133 only when flip-flop stage B of flip-flop 140 has a TRUE output and in the absence of an inhibit signal from inverter 141. Stage B of flip-flop 140 is driven TRUE in response to an output signal from AND gate 143. AND gate 143 receives as its input the outputs of vehicle detector 11 and OR gate 145. AND gate 143 is driven to the TRUE condition to provide an actuation signal for flip-flop stage B of flip-flop 140 when a vehicle arrives on the "waiting" street to actuate vehicle detector 11. This occurs only when traffic signal control 42 is generating a "red" or "yellow" control signal for the traffic signal on the "waiting" street.

Thus, with the arrival of the first vehicle at the red or yellow signals, the output of flip-flop 140 will enable AND gate 131 to pass clock pulses from clock pulse generator 130 to scaling counter 133 (assuming, of course, that there is no inhibit signal, indicating that the counter is "full," presented from inverter 141). Scaling counter 133 will generate count signal outputs in stages 1–10 successively in response to the clock pulse output of clock pulse generator 130 until the stage to which switch 145 is connected is activated. When this occurs, a re-set signal for the counter is fed from the activated stage through OR gate 147 to re-set scaling counter 133 to zero, whereupon the count is resumed. Such re-setting signals are also fed to register 60 to provide actuation of such register. Scaling counter 133 thus operates in the same manner as scaling counter 50 described in connection with FIG. 2. In this instance, however, timing signals rather than signals representing numbers of vehicles are involved. So also the operation of register 60 is identical to the operation described for the same numbered register in connection with FIG. 2, and thus scaled outputs representing 40%, 80% and 100% of the register capacity are generated at terminals 70, 71 and 72 respectively. In this instance, of course, rather than representing the number of cars waiting, these outputs represent the time that the first car to arrive before the traffic signal on the "waiting" street has been waiting. The utilization of this information in the logical control circuitry 35 and the operation of such circuitry is identical with that described for the corresponding circuitry 17 of FIG. 2 and need not be repeated. Thus, a signal for controlling the extension green timing interval in accordance with the time vehicles have been held on the "waiting" street is generated, such signal being utilized to actuate traffic signal control 95.

Referring now to FIG. 4, a schematic drawing is shown which illustrates the circuitry for accomplishing control in response to the density of traffic on the "moving" street. Here again, the logical control circuitry 41 corresponds identically with the control circuitry 17 and 35 described in connection with FIGS. 2 and 3. In this instance, however, a traffic density computer 37 is utilized to provide output signals at terminals 70–72 which indicate the density of the moving traffic. Vehicle detector 19 generates an output pulse for each vehicle passing on the "moving" street. These pulses are fed to AND gate 150. AND gate 150 passes such pulses through to scaling counter 152 when traffic signal control 95 is actuating the green signal on the "moving" street and in the absence of an inhibit pulse from inverter 155 (such an inhibit pulse appearing when register 60 is full). Thus, scaling counter 152 divides the actuations in response to vehicle actuating detector 19 on the "moving" street. In the embodiment shown, each scaling counter output represents an incremental count of ten vehicles.

Switch 170 operates similarly to switches 55 and 145 as described in connection with FIGS. 2 and 3 to scale the output of counter 152 by providing a re-set pulse therefor through OR gate 163 when the selected count has been reached. These scaled output signals are used to drive register 60 in the same manner as described in connection with FIGS. 2 and 3 for the correspondingly numbered registers. The outputs of flip-flops 62 and 63 and AND gate 64, representing the signal inputs accumulated on register 60, are respectively fed to gating units A, B and C of gates 175. These signals are transferred from gates 175 to corresponding stages of register 180 in response to a transfer signal fed from clock pulse generator 160, each time a clock pulse appears at the output of this generator.

Clock pulse generator 160 has a precision pulse output which in the preferred embodiment of the device of the invention has a frequency of $\frac{1}{10}$ cycle per second. Thus, the accumulated count representing the number of vehicles which have actuated detector 19 and which appears at the output of register 60 is transferred from this register to register 180 in response to the clock generator pulses every ten seconds. The pulse output of clock pulse generator 160 is also fed through delay line 162 and OR gates 163 and 164 to reset scaling counter 152 and register 60, respectively. In this manner, a new count is initiated every ten seconds with a readout from register 180 appearing on terminals 70–72 indicative of the number of cars which have passed the intersection during the preceding 10-second timing interval. When register 60 is "full" an inhibit signal is fed through inverter 155 to AND gate 150 to prevent further vehicle counting. Thus, the outputs at terminals 70–72 represent the rate of traffic flow or the density of traffic on the moving street. This information is logically correlated by logical control and minimum gap selection circuitry 41 in precisely the same manner as described for the corresponding circuitry 17 and 35 of FIGS. 2 and 3 respectively to provide a control signal for the extension green timing.

It can readily be appreciated that other traffic conditions can be computed in the same fashion to provide control criteria in establishing the extension green timing interval, such circuitry being made to operate in the same fashion as described in connection with FIGS. 2–4. In each instance, the particular condition involved is continually computed so that a control signal responsive to immediate traffic conditions is developed. Thus, the extension green timing interval is established in accordance with the minimum timing interval demanded by the various individual conditions computer to satisfy the most urgent demand established by these selected criteria. Thus, for example, if the density control function should indicate a 100% actuation call with a minimum gap setting of 1 second established by switch 90, then the extension green timing interval will be set at 1 second regardless of the control conditions established by the other control parameters. If this density, however, should drop off to only 40% of the established maximum criterion, then the extension timing interval could be established by one of the other controls, such as, for example, the timing waiting control in a situation where register 60 for this control were at 80% of its maximum capacity and the measured gap output indicated 3 or more seconds between the arrival of vehicles.

The system of this invention thus provides highly accurate and reliable means for varying the extension green timing interval of a traffic controller in accordance with preestablished criteria and in response to the immediate traffic conditions. In this manner, optimum traffic control is automatically assured.

While the system of this invention has been described and illustrated in detail, it is to be clearly understood that this is intended by way of illustration and example only and is not to be taken by way of limitation, the spirit and scope of this invention being limited only by the terms of the following claims.

We claim:

1. A self-adaptive timing system for use with a traffic controller, said controller having first and second sets of traffic signals for controlling traffic on first and second intersecting streets respectively, said traffic controller having an actuated phase of operation with a green extension timing interval for controlling said first set of signals, said timing system comprising means for computing the immediate state of at least one traffic condition on at least one of said streets, gap counter means for generating a timing signal in accordance with the gaps between traffic on said first street, said gap counter means including a clock pulse generator, vehicle detector means for generating an output pulse signal for each vehicle arriving on said first street, and shift register means for generating timing signal outputs, the output of said clock pulse generator being fed to drive said shift register means, said pulse signal being fed to said shift register means as a reset signal therefor, the maximum timing output of said shift register means being determined by the gap between the vehicles arriving at said intersection on said first street, logical gating control means responsive to the outputs of said gap counter means and said computing means for comparing said outputs and generating a timing signal which is a function of the relationship therebetween, and means for connecting the output of said logical gating control means to said traffic controller to control the green extension timing interval of said actuated phase of operation, whereby said green extension timing interval is varied in accordance with the immediate state of said traffic condition.

2. The timing system as recited in claim 1 wherein said logical gating control means includes a plurality of gating circuits, each of said circuits having an output with a different range of timing signals and additionally including selector means for alternatively connecting one of said circuits to said traffic controller.

3. The timing system as recited in claim 1 wherein said computing means includes a vehicle detector for generating an output signal in response to each vehicle arriving on said first street and means responsive to said vehicle detector for generating a signal in accordance with the number of vehicles arriving at said signal on said first street in a predetermined time interval.

4. The timing system as recited in claim 3 wherein said computing means additionally includes a second vehicle detector for generating an output signal in response to each vehicle arriving at said intersection on said second street, and means responsive to said second vehicle detector for generating a signal in accordance with the number of vehicles arriving at said intersection on said second street.

5. The timing system as recited in claim 4 wherein said computing means additionally includes means responsive to said second vehicle detector for generating a signal in accordance with the time vehicles on said second street have been waiting at the intersection between said streets.

6. A self-adaptive timing system for use with a traffic controller, said controller having first and second sets of traffic signals for controlling traffic on first and second intersecting streets respectively, said traffic controller having an actuated phase of operation with a green extension timing interval for controlling said first set of signals, said timing system comprising first detector means for generating a pulse signal output for each vehicle arriving at said traffic signals on said first street, second detector means for generating a pulse signal output for each vehicle arriving at said traffic signals on said second street, first computing means responsive to the output of said first detector means for computing the density of traffic on said first street, second computing means responsive to the output of said second detector means for computing the number of vehicles waiting at said traffic signals on said second street, gap counter means responsive to the output of said first detector means for generating a timing signal in accordance with the gaps between traffic on said first street, first and second logical gating control means responsive to the outputs of said gap counter means and said first and second computing means respectively for comparing said outputs and generating timing signals which are a function of the relationships between the compared outputs, and means for connecting the outputs of said logical gating control means to said traffic controller to control the green extension timing interval of said actuated phase of operation, each of said computing means including a digital counter for counting the output pulses of an associated one of said detector means and digital register means having outputs representing predetermined percentages of the full count of said register means, said logical gating control means including a logical gate for receiving each of said register means outputs, whereby said green extension timing interval is varied in accordance with the density of traffic on said first street and the number of vehicles waiting on said second street.

7. The system as recited in claim 6 and additionally including third computing means responsive to the output of said second detector means for computing the time that vehicles have been waiting at said traffic signals on said second street and third logical gating control means responsive to the outputs of said third computing means and said gap counter means for generating a timing signal in accordance with the relationship therebetween, the output of said third logical control means being fed to said traffic controller to control the green extension timing interval.

8. In combination, a traffic controller having first and second sets of traffic signals for controlling traffic on first and second intersecting streets respectively, said traffic controller having at least one actuated operating phase controlling said first traffic signal, and a self-adaptive timing system for varying the length of the green extension timing cycle of said actuated operating phase, said timing system including means for computing the volume of traffic waiting at said second traffic signal on said second street, means for computing the density of traffic on said first street, each of said computing means including a separate vehicle detector for generating a pulse output in accordance with the vehicles arriving on each of said streets respectively, digital scaling counter means responsive to the output of an associated one of said detectors for scaling said output as desired, and digital register means responsive to the output of said scaling counter means for generating output signals in accordance with predetermined percentages of a maximum count reached on said register, gap counter means for generating a timing signal in accordance with the gaps between traffic on said first street, a respective logical gating control means for each of said computing means responsively connected to the associated computing means and to said gap counter means for comparing said gap counter means output with each of said computing means outputs respectively and generating a timing signal in accordance with the relationship therebetween, and gating means for connecting the outputs of said logical gating control means to said traffic controller to control the green extension timing of said actuated phase, whereby said green extension timing cycle is varied in accordance with the shortest duration timing signal received by said gating means.

9. The system as recited in claim 8 wherein said gap counter means includes a clock pulse generator and shift register means for generating timing signal outputs, the output of said clock pulse generator being fed to said shift register means as a drive signal therefor, the output of the vehicle detector for said first street being fed to said shift register as a reset signal therefor.

10. The timing system as recited in claim 9 wherein said logical gating control means includes a plurality of logical gating circuits, each of said circuits having an output with a different range of timing signals and additionally including selector means for connecting one of said circuits to said traffic controller.

11. In combination, a traffic controller having first and second sets of traffic signals for controlling traffic on first and second intersecting streets respectively, said traffic controller having at least one actuated operating phase controlling said first traffic signal, and a self-adaptive timing system for varying the length of the green extension timing cycle of said actuated operating phase, said timing system including first and second detector means for generating output pulses in response to vehicles arriving on said first and second streets respectively, means responsive to said first detector means for computing the immediate state of a first traffic condition on said first street, means responsive to said second detector means for computing the immediate state of a second traffic condition on said second street, gap counter means responsive to said first detector means for generating a timing signal in accordance with the gaps between traffic on said first street, a respective logical gating control means for each of said computing means responsively connected to the associated computing means and to said gap counter means for comparing said gap counter means output with each of said computing means outputs respectively and generating a timing signal in accordance with the relationship therebetween, and gating means for connecting the outputs of said logical gating control means to said traffic controller to control the green extension timing of said actuated phase, each of said computing means including a digital counter for counting the output pulses of an associated one of said detector means and digital register means having outputs representing predetermined percentages of the full count of said register means, said logical gating control means including a logical gate for receiving each of said register means outputs, whereby said green extension timing cycle is varied in accordance with the shortest duration timing signal received by said gating means.

References Cited

UNITED STATES PATENTS

| | | | |
|---|---|---|---|
| 3,241,108 | 3/1966 | Du Vivier | 340—37 |
| 3,241,109 | 3/1966 | Du Vivier | 340—37 |
| 3,333,240 | 7/1967 | Gerlough | 340—36 |

THOMAS B. HABECKER, *Primary Examiner.*